United States Patent [19]

Geywitz et al.

[11] Patent Number: 5,651,008
[45] Date of Patent: Jul. 22, 1997

[54] METHOD AND CIRCUIT ARRANGEMENT FOR COORDINATING ACCESS BY A PLURALITY OF INFORMATION SOURCES TO A BUS

[75] Inventors: Klaus Geywitz, Gerlingen; Joachim Endler, Stuttgart, both of Germany

[73] Assignee: Alcatel N.V., Rijswijk, Netherlands

[21] Appl. No.: 399,460

[22] Filed: Mar. 7, 1995

[30] Foreign Application Priority Data

Mar. 9, 1994 [DE] Germany .......................... 44 07 795.5

[51] Int. Cl.$^6$ .................................................. H04J 3/14
[52] U.S. Cl. ................................... 370/438; 370/445
[58] Field of Search ............................. 370/85.2, 85.3, 370/85.11, 100.1, 85.1, 85.9, 95.1, 95.2, 95.3, 105.3; 379/59, 60; 415/33.1, 33.2, 51.1, 54.1, 68, 53.1, 54.2

[56] References Cited

U.S. PATENT DOCUMENTS

| | | | |
|---|---|---|---|
| 4,969,120 | 11/1990 | Azevedo et al. | 364/927.92 |
| 5,065,153 | 11/1991 | Tomita et al. | 370/85.2 |
| 5,172,373 | 12/1992 | Suzuki | 370/85.11 |
| 5,416,778 | 5/1995 | Chan et al. | 370/95.1 |
| 5,418,838 | 5/1995 | Havermang et al. | 379/60 |
| 5,513,184 | 4/1996 | Vannucci | 370/105.3 |
| 5,533,027 | 7/1996 | Akerberg et al. | 370/97 |

FOREIGN PATENT DOCUMENTS

| | | |
|---|---|---|
| 2837214 | 7/1987 | Germany . |
| 3300262 | 7/1990 | Germany . |
| 4040933 | 6/1992 | Germany . |
| 3343456 | 9/1992 | Germany . |
| 4108796 | 9/1992 | Germany . |
| 4326964 | 2/1994 | Germany . |
| 4238410 | 5/1994 | Germany . |

OTHER PUBLICATIONS

Tuttelbee, Walter H.W. : Cordless Personal Communication: in IEEE Comm. Magazine, Dec. 1992, pp. 42–53.

Taylor, Richard: Multiport Wäleinrichtung für mehrere Standorte in privaten Mobilfunksystemen In: Philips Telecommunication Review, vol. 51, No. 2, 1993 pp. 27–34.

Färber, Georg: Bussysteme. R. Oldenbourg Verlas, München Wien 1987, 2.Aufl., pp. 36, 37.

*Primary Examiner*—Douglas W. Olms
*Assistant Examiner*—Ajit Patel
*Attorney, Agent, or Firm*—Ware, Freesola, Van Der Sluys & Adolphson LLP

[57] ABSTRACT

To prevent competitive situations when accessing a bus, it is known to use control circuits and to coordinate the access of the information sources to the bus by means of organization lines between the information sources and the information sinks. According to the invention, the access entitlement is switched from one information source to another by the desire to access, which is triggered by the information offer via a control line (TSDIS) connected to the information source (MAC-ASIC 1, MAC-ASIC 2, MAC-ASIC 3, MAC-ASIC n). The method can be used in a telecommunications installation operating according to the DECT standard or the CT 2 or CT 3 standard, if, when the subscriber changes location, the original radio connection is changed from a first base station (BS 1) to a second base station (BS 2), which has a better transmission path available.

7 Claims, 4 Drawing Sheets

METHOD AND CIRCUIT ARRANGEMENT FOR COORDINATING ACCESS BY A PLURALITY OF INFORMATION SOURCES TO A BUS

TECHNICAL FIELD

The invention concerns a method and a circuit arrangement for coordinating the access of several information sources to a bus.

BACKGROUND OF THE INVENTION

When several units or several devices are connected to a bus, it can happen that at least two units or devices want to transmit and access the bus simultaneously. To avoid such competitive situations, it is generally known to insert a control circuit in a bus, to control and ensure the transmission of the information. The problem is solved for the remote control technique by providing two organization lines for the control, one of which is connected as a request line to the units or devices and the second serves as a stop line, to stop an address counter during the time a unit or a device outputs data, see DE 33 43 456 C2. The known solutions have in common that the information sink, which is connected to the bus or to the line through at least one additional control line, controls the information source's mode of operation in such a way, that only one information source is placed in the transmission condition during a predetermined period of time.

SUMMARY OF THE INVENTION

The invention fulfills this task by coordinating and synchronizing the access of several information sources to a bus without using an additional line between the information source and the information sink, and without having to establish a direct access to a switching register or to a computer.

The invention is described by a method of information sources having a central control unit associated therewith to a bus, characterized in that an information source, by offering information, signals to the central control unit that it wishes to access the bus, that the access is prepared via a control line whose state is sensed by the information sources, and that in the event of a change of potential on the control line, mastership of the bus passes from one information source to another information source in accordance with a master-slave mechanism. It is also directed to a circuit for carrying out this method wherein the information sources each contain an open-collector stage, with all of the open-collector stages connected in common through a resistor to a voltage source.

The fulfillment of the above named task has practical significance for telecommunication installations with cordless terminals. A competitive situation always occurs in these installations when access to the installation by two base stations can take place simultaneously, due to a change in the location of the cordless terminal within a cell bundle produced by two base stations, for example. The solution of the invention ensures that a change from a first cell to a second cell within a cell bundle takes place without interruption, and is not noticed by the subscriber. This process is called "Seamless Inter-Cell Bearer Handover" by the DECT standard, which will be mentioned later on.

The characteristic of the invention is that the offered information prepares a real time switchover from a first base station to a second base station, while the process of the invention itself and the synchronization are carried out by means of special signalization.

BRIEF DESCRIPTION OF THE DRAWINGS

In the following, the invention is explained by means of a configuration example. The corresponding drawings are.

BEST MODE FOR CARRYING OUT THE INVENTION

The effect of the invention is depicted in a telecommunications system with cordless terminals, in the present case cordless telephones, for example. The essential functions and characteristics of such a telecommunications system have been described by a European standardization committee, the European Telecommunications Standards Institute ETSI, as the European standard for cordless telecommunication DECT, the Digital European Cordless Telecommunications—Standard.

However, the invention can also be used without problems in a telecommunications system that operates according to the CT standard, particularly the CT 2 and CT 3 standards. The CT standard, Cordless Telecommunications Standard, was developed by CEPT, the Conference Européenne des administrations des Postes et des Télécommunications, and was modified over the course of years and then called CT 2 and CT 3, for example.

Figure 1:
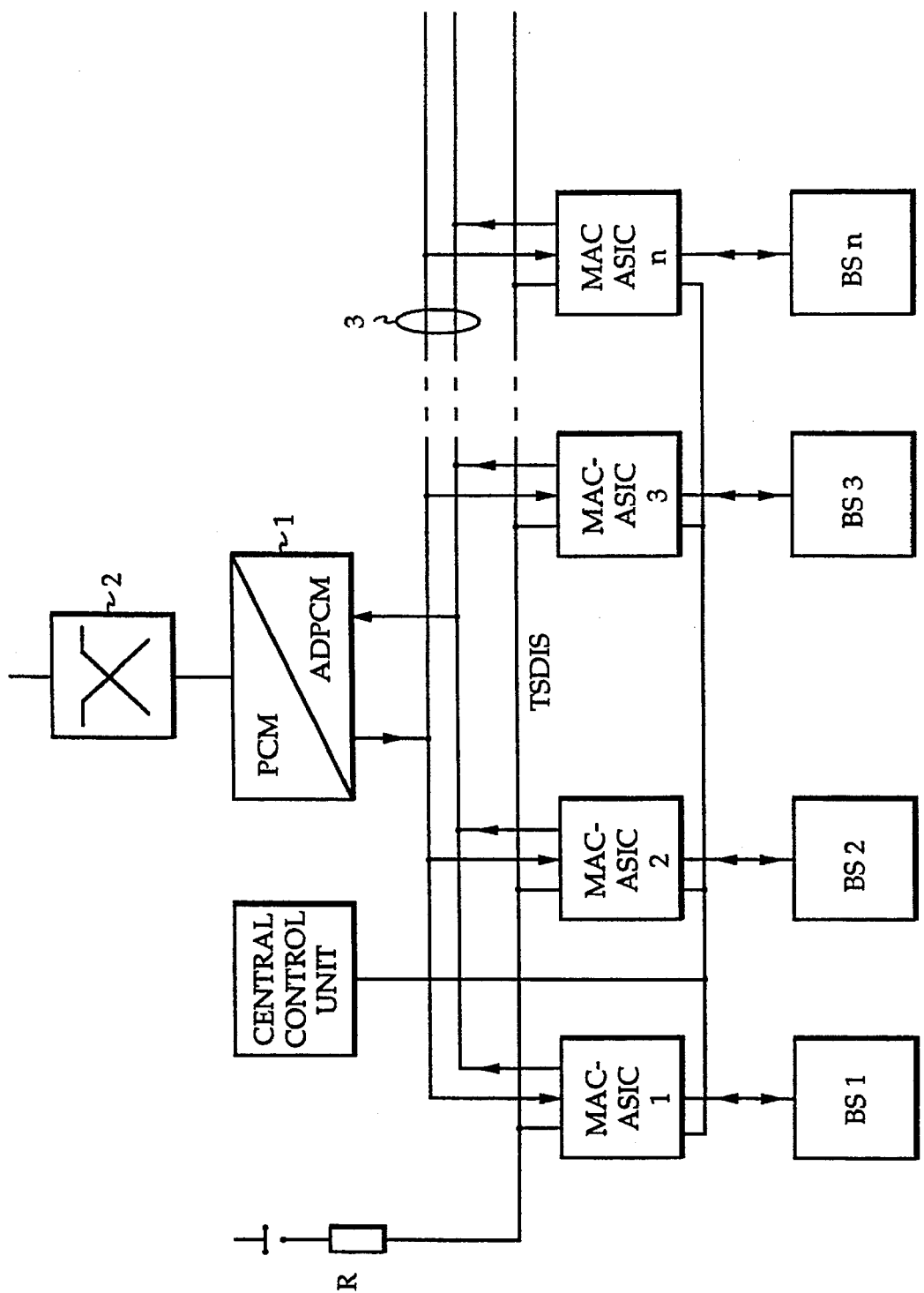
FIG. 1, a diagram of the circuit arrangement of the invention.
Figure 4:
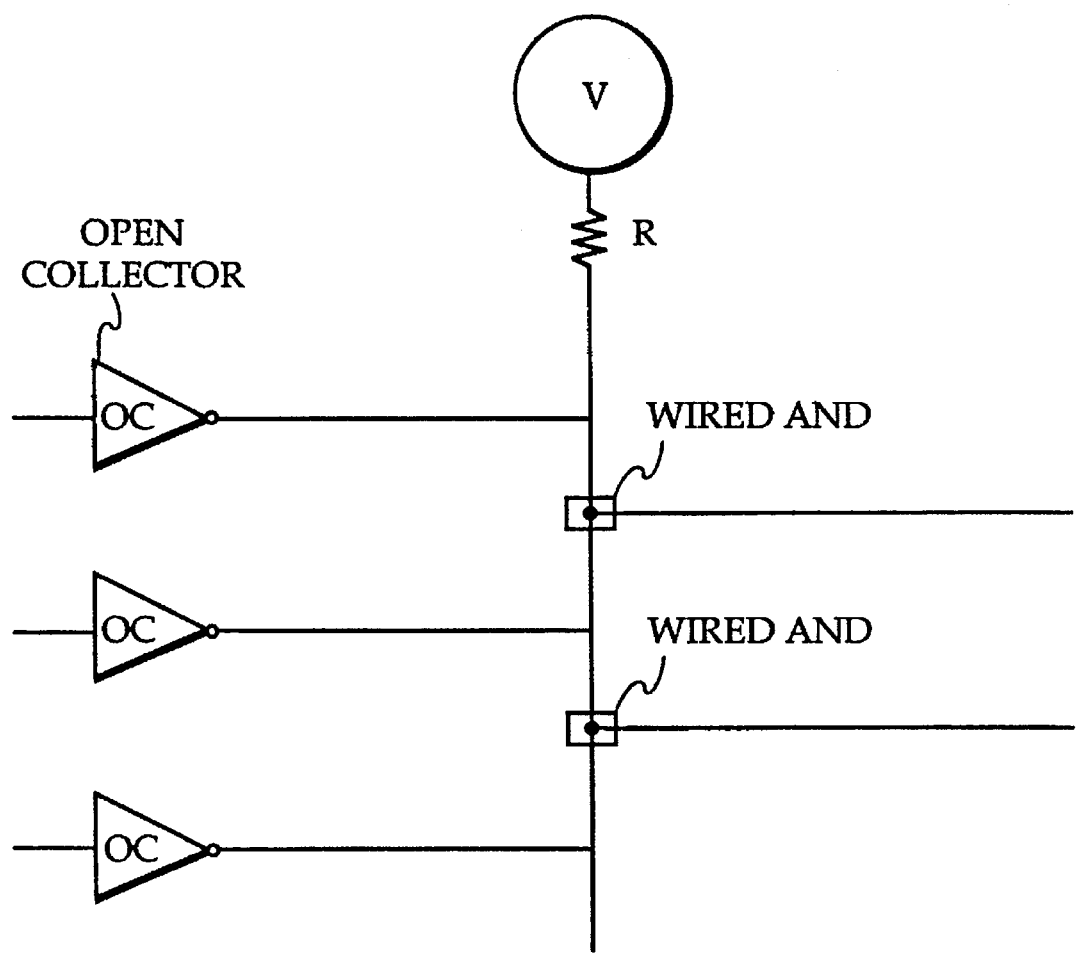
FIG. 4 shows each open collector stage of the information sources (MAC-ASIC 1, MAC-ASIC 2, MAC-ASIC 3, MAC-ASIC n) shown in FIG. 1.

According to FIG. 1, the circuit arrangement of the invention essentially comprises any number of base stations BS 1, BS 2, BS 3, BS n, with assigned application-specific circuits MAC-ASIC 1, MAC-ASIC 2, MAC-ASIC 3, MACASIC n, and an ADPCM/PCM converter 1, as well as block 2 which indicates the other switching unit. The ADPCM/PCM converter 1 is connected to the application-specific circuits MAC-ASIC 1 . . . MAC-ASIC n by a data bus 3, in this instance an ADPCM-highway. Each of the application-specific circuits MAC-ASIC 1 . . . MAC-ASIC n contains an open collector stage, which terminates in a common resistor R, as shown in FIG. 4. The thus created connection is called TSDIS, derived from Time Slot Disable. According to the Medium Access Control layer, the MAC-layer, the application-specific circuits MAC-ASIC 1 . . . MAC-ASIC n, perform the functions of selection, adjustment and release of the channels, and establish the end-to-end connection, with the aid of a not illustrated central control device.

Figure 2:
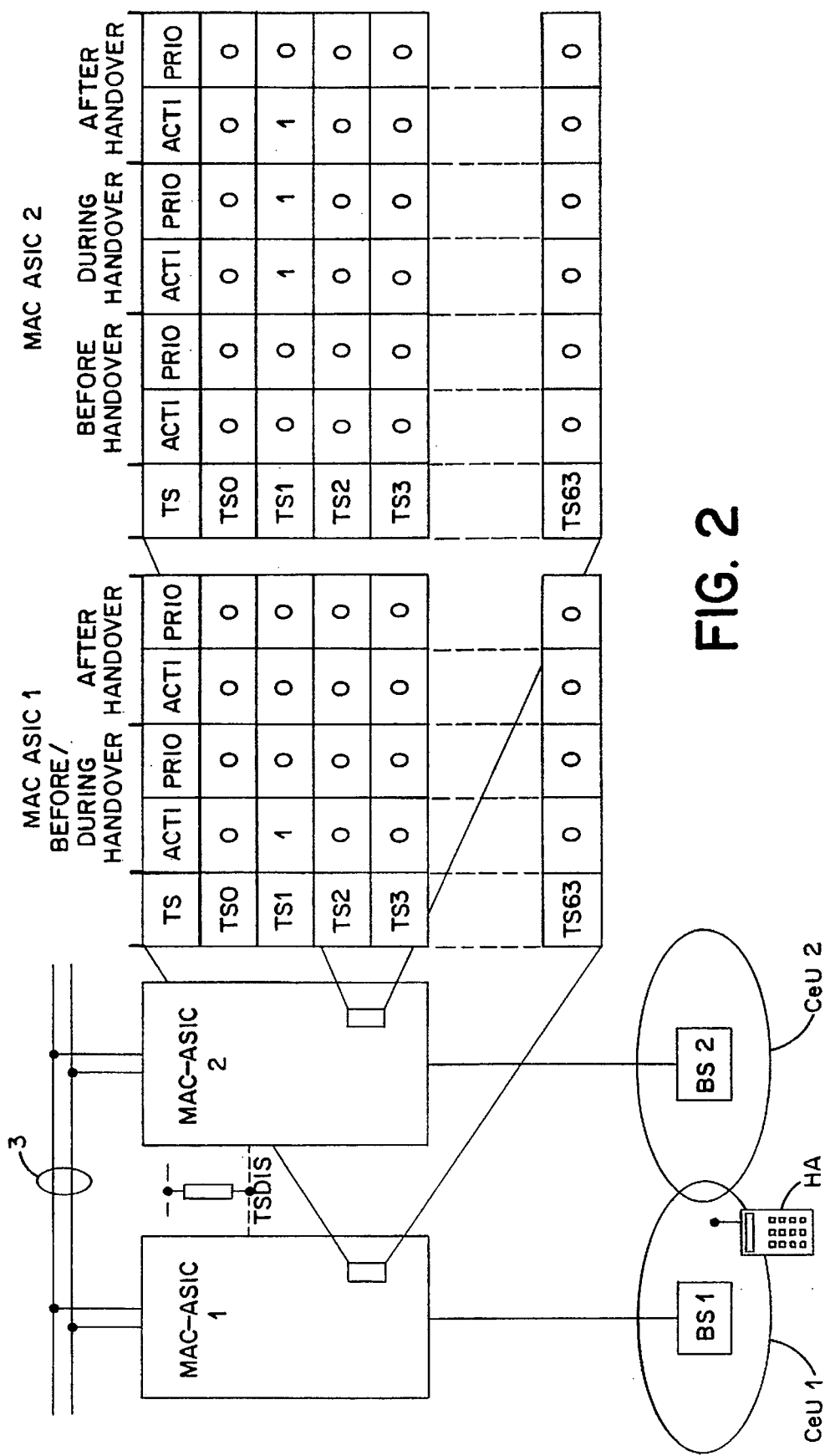
FIG. 2, a schematic illustration of the processes during the Inter-Cell Bearer Handover.

If a handset HA, illustrated in FIG. 2, is located in the first radio cell 1 formed by the first base station BS 1, a radio connection is established between handset HA and the first base station BS 1 upon a request for a connection. When a call connection is established, only two of 24 time slots are used alternately between the sending and the receiving signal within a 10 ms frame. The remaining time is used by the handset HA to monitor other frequencies and time slots, for possibly switching the call over to a more favorable channel, when it becomes available. This process takes place within a radio cell, or when the subscriber with the handset HA leaves the first radio cell 1 and enters the range of a second radio cell 2, while the ranges of the first and the second radio cell 1 and 2 overlap. In that case a second radio connection is established between the handset HA and the second base station BS 2, parallel to the already existing radio connection between handset HA and the first base station BS 1. While the ADPCM-highway 3 can read data from the first application-specific circuit MAC-ASIC 1 in parallel with the second application-specific circuit MAC-ASIC 2 without any problem, the writing process must be coordinated to prevent a collision on the ADPCM-highway. For that reason only one application-specific circuit has priority to transmit data over the ADPCM-highway 3. In the present example, the first application-specific circuit MAC-ASIC 1 has the master function. The status of the TSDIS line is scanned before the transmission, to indicate whether the master function is to be retained further. If the radio signal from handset HA received by the second base station BS 2 is stronger than the one received by the first base station BS 1, the situation causes the central computer control to provide information leading to a change in base station. The so-called handover process itself is carried out by the TSDIS line by a change of potential in the TSDIS line, which informs the first application-specific circuit MAC-ASIC 1 that its master function has ended and has passed on to the second application specific circuit MAC-ASIC 2.

FIG. 2 illustrates details of the procedural steps during the change of base stations. In normal operation, each application-specific circuit MAC-ASIC 1, MAC-ASIC 2 is assigned a predetermined time slot on the ADPCM-highway 3, and the TSDIS line is kept in its passive condition. Each application-specific circuit MAC-ASIC must scan the TSDIS line before the transmission, and can only access the ADPCM-highway 3 when the TSDIS line is in its passive condition. If an active status is signalled, another application-specific circuit MAC-ASIC receives priority to access the assigned time slot.

In the example depicted in FIG. 2, the first application-specific circuit MAC-ASIC 1 and time slot TS 1 are assigned to handset HA. During normal operation, this time slot contains an active bit ACTI "1" and a priority bit PRIO "0". In the case of the handover situation, it is necessary to synchronize the functions of application-specific circuits MAC-ASIC 1, MAC-ASIC 2 in such a way, that at the time of switching from the first application-specific circuit MAC-ASIC 1 to the second application-specific circuit MAC-ASIC 2, namely the handover, no speech parts are lost and the change in base station takes place without any interruption. To that effect, the active bit ACTI and the priority bit PRIO are set to "1" in time slot TS 1 of the second application-specific circuit MAC-ASIC 2. When the priority bit PRIO is set to "1" in the second application specific circuit MAC-ASIC 2, it signals the first time slot TS 1 in the first application-specific circuit MAC-ASIC 1 via the TSDIS line not to occupy the first time slot TS 1 any further. At that moment, the change in base station has taken place without interruption, and the active bit ACTI from the first application specific circuit MAC-ASIC 1 and the priority bit PRIO from the second application-specific circuit MAC-ASIC 2 are reset from "1" to "0". The master function of the transmission is now handed over to the second application-specific circuit MAC-ASIC 2.

Figure 3:
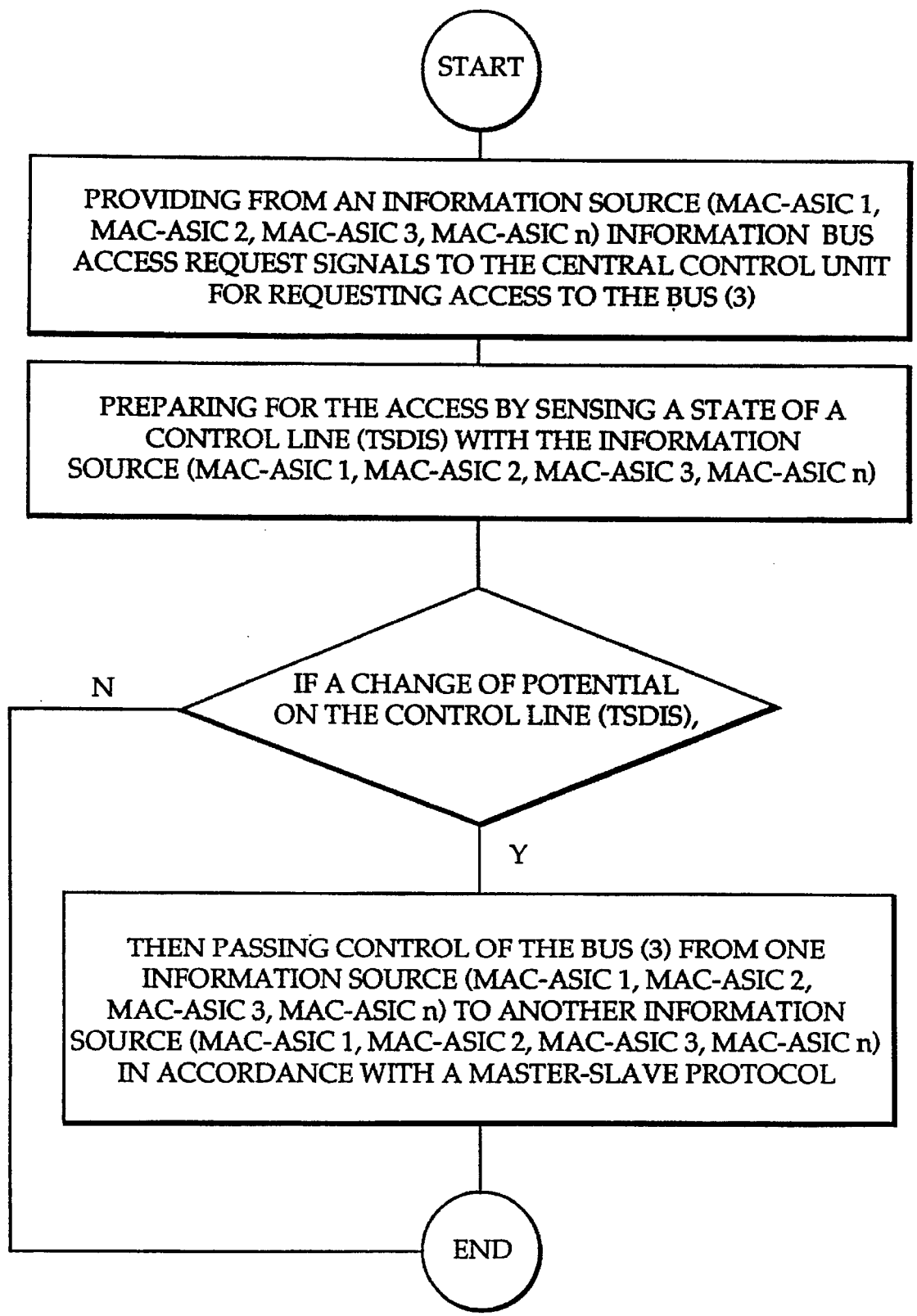
FIG. 3 is a flowchart of a method of coordinating access by information sources (MAC-ASIC 1, MAC-ASIC 2, MAC-ASIC 3, MAC-ASIC n) having a central control unit associated therewith to a bus.

FIG. 3 is a flowchart of a method of coordinating access by information sources (MAC-ASIC 1, MAC-ASIC 2, MAC-ASIC 3, MAC-ASIC n) having a central control unit associated therewith to a bus.

What is claimed is:

1. A method of coordinating access by a plurality of information sources (MAC-ASIC 1, MAC-ASIC 2, MAC-ASIC 3, MAC-ASIC n) having a central control unit associated therewith to a bus (3), characterized in that the method comprises the steps of:

providing from an information source (MAC-ASIC 1, MAC-ASIC 2, MAC-ASIC 3, MAC-ASIC n) information bus access request signals to the central control unit for requesting access to the bus (3), preparing for the access by sensing a state of a control line (TSDIS) with the information source (MAC-ASIC 1, MAC-ASIC a, MAC-ASIC 3, MAC-ASIC n), and that in the event of a change of potential on the control line (TSDIS), passing control of the bus (3) from one information source (MAC-ASIC 1, MAC-ASIC 2, MAC-ASIC 3, MAC-ASIC n) to another information source (MAC-ASIC 1, MAC-ASIC 2, MAC-ASIC 3, MAC-ASIC n) in accordance with a master-slave protocol, wherein each of the plurality of information sources (MAC-ASIC 1, MAC-ASIC 2, MAC-ASIC 3, MAC-ASIC n) is a Medium Access Control—Application Specific Integrated Circuit.

2. A method as claimed in claim 1, characterized in that the method further comprises the step of:

changing the potential on the control line (TSDIS) in a time-slot pattern of information transferred to the bus (3), so that synchronism of the information sources (MAC-ASIC 1, MAC-ASIC 2, MAC-ASIC 3, MAC-ASIC n) is preserved when bus mastership passes from one information source (MAC-ASIC 1, MAC-ASIC 2, MAC-ASIC 3, MAC-ASIC n) to another information source (MAC-ASIC 1, MAC-ASIC 2, MAC-ASIC 3, MAC-ASIC n).

3. A method as claimed in claim 2, characterized in that the method further comprises the step of:

performing the steps of the method in a telecommunications system based on the Digital European Cordless Telecommunications (DECT) standard during seamless intercell handover.

4. A method as claimed in claim 2, characterized in that the method further comprises the step of:

performing the steps of the method in a telecommunications system based on the Cordless Telecommunications standards (CT2 or CT3) during seamless intercell handover.

5. A circuit arrangement for carrying out the method claimed in claim 1, characterized in that the method further comprises the step of:

providing the information sources (MAC-ASIC 1, MAC-ASIC 2, MAC-ASIC 3, MAC-ASIC n) each having an open-collector stage connected in common through a resistor (R) to a voltage source.

6. A method as claimed in claim 1, characterized in that the method further comprises the step of:

performing the steps of the method in a telecommunications system based on the Digital European Cordless Telecommunications (DECT) standard during seamless intercell handover.

7. A method as claimed in claim 1, characterized in that the method further comprises the step of:

performing the steps of the method in a telecommunications system based on the Cordless Telecommunications Standards (CT2 or CT3) during seamless intercell handover.

* * * * *

UNITED STATES PATENT AND TRADEMARK OFFICE
CERTIFICATE OF CORRECTION

PATENT NO. : 5,651,008
DATED : July 22, 1997
INVENTOR(S) : Geywitz et al

It is certified that error appears in the above-identified patent and that said Letters Patent is hereby corrected as shown below:

Title page,

Item [56], line 7, please cancel "Havermang" and substitute -- Havermans --; and At line 29, please cancel "Freesola" and substitute -- Fressola --.

Signed and Sealed this

Sixteenth Day of December, 1997

Attest:

BRUCE LEHMAN

*Attesting Officer*  *Commissioner of Patents and Trademarks*